(12) United States Patent
O'Keefe, Jr.

(10) Patent No.: US 6,402,954 B1
(45) Date of Patent: Jun. 11, 2002

(54) METHOD AND APPARATUS FOR MONITORING AND CLEANING A FLUID FILTER SYSTEM

(76) Inventor: Patrick J. O'Keefe, Jr., 47585 Peck Wadsworth Rd., Wellington, OH (US) 44090

( * ) Notice: Subject to any disclaimer, the term of this patent is extended or adjusted under 35 U.S.C. 154(b) by 0 days.

(21) Appl. No.: 08/980,779

(22) Filed: Dec. 1, 1997

(51) Int. Cl.$^7$ .......................... B01D 61/22; B01D 65/02
(52) U.S. Cl. ......................... 210/636; 210/87; 210/93; 210/108; 210/139; 210/321.69; 210/739; 96/422
(58) Field of Search .................. 210/87, 90, 106, 210/108, 139, 141, 195.1, 321.69, 332, 407, 409, 411, 636, 739, 791, 805, 93, 275, 637; 96/422

(56) References Cited

U.S. PATENT DOCUMENTS

| | | | | |
|---|---|---|---|---|
| 3,992,301 A | * | 11/1976 | Shippey et al. | 210/321.69 |
| 4,708,790 A | * | 11/1987 | Bray | 210/321.69 |
| 4,918,426 A | * | 4/1990 | Butts et al. | 210/739 |
| 4,921,610 A | * | 5/1990 | Ford et al. | 210/636 |
| 4,935,143 A | * | 6/1990 | Kopp et al. | 210/636 |
| 5,147,552 A | * | 9/1992 | Hlavacek et al. | 210/636 |
| 5,647,988 A | * | 7/1997 | Kawanishi et al. | 210/321.69 |

\* cited by examiner

Primary Examiner—Joseph W. Drodge
(74) Attorney, Agent, or Firm—Renner, Kenner, Greive, Bobak, Taylor & Weber

(57) ABSTRACT

A method and apparatus for optimizing the filtration of process fluid. The system provides establishing a peak flow rate of permeate through a filter and then engaging a filtering cycle in which process fluid is passed through the filter until such time as the flow rate of permeate through the filter reaches a predetermined level which is set as a function of the initial permeate flow rate. At that point in time, a cleaning cycle is entered, during which cleaning fluid is passed through the filter for such a period of time as is necessary to allow the permeate flow rate with the cleaning solution to stabilize. At that point in time, the processing of process fluid is recommenced and the process continues on a repetitive basis between the processing of process fluid and the cleaning of the filter.

7 Claims, 3 Drawing Sheets

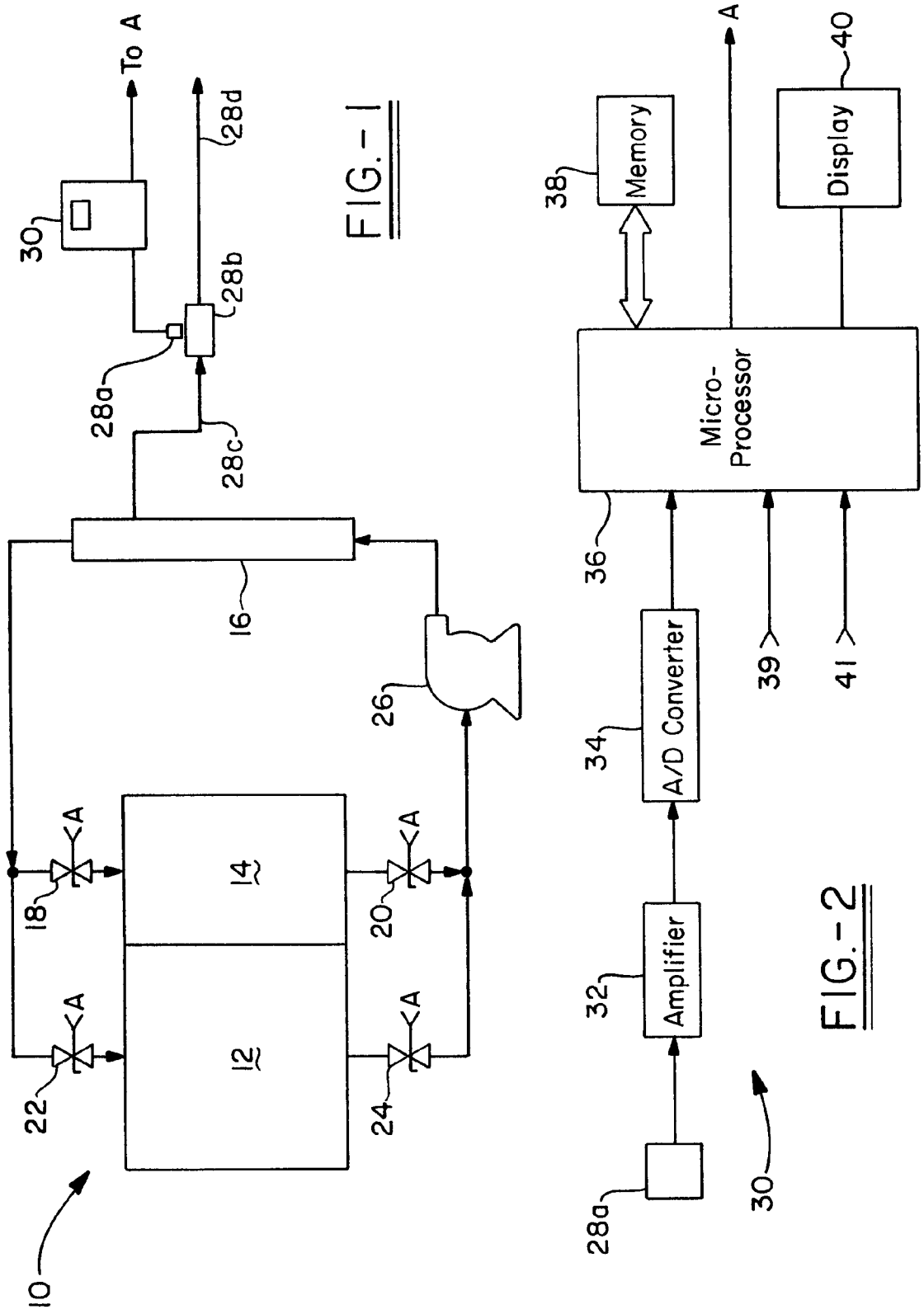

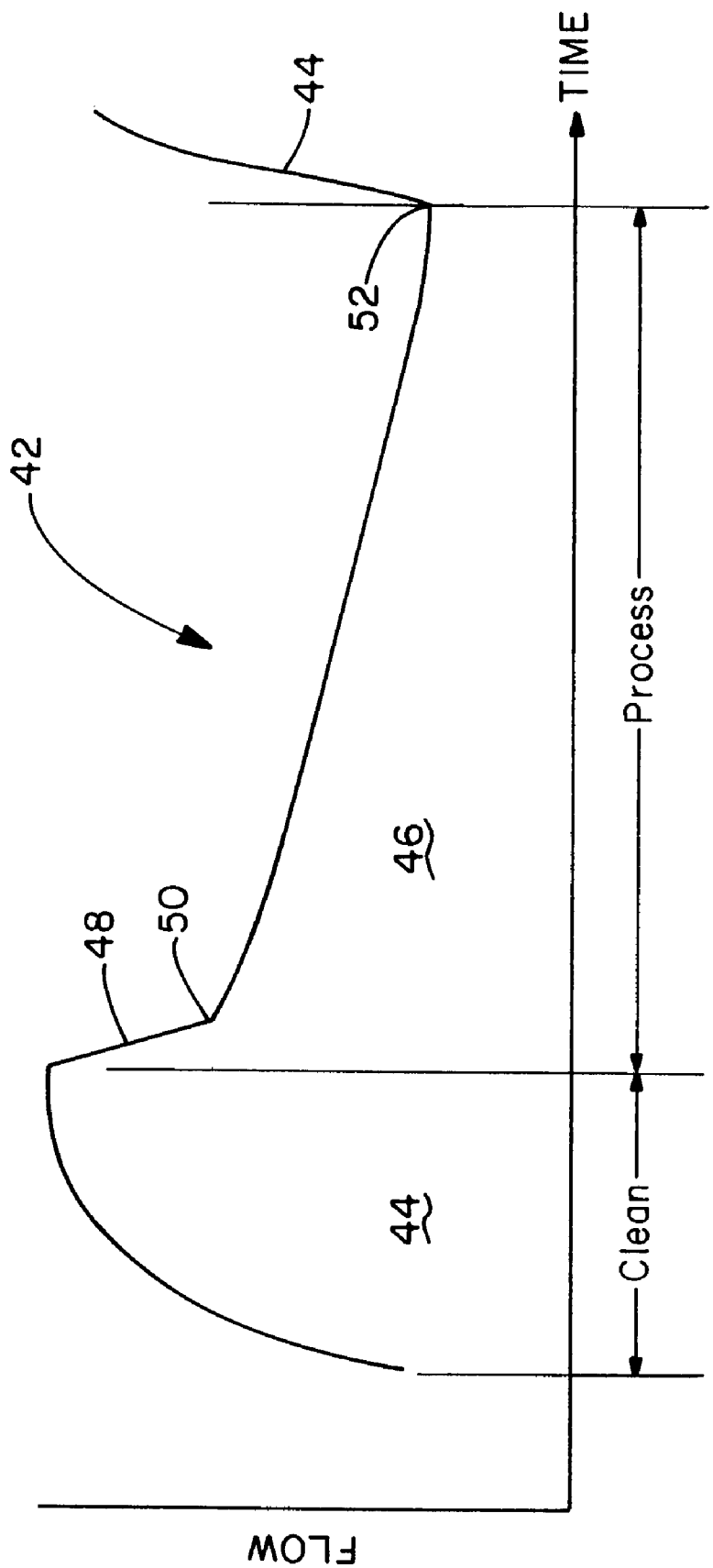

METHOD AND APPARATUS FOR MONITORING AND CLEANING A FLUID FILTER SYSTEM

TECHNICAL FIELD

The invention herein resides in the art of fluid filtration systems and, more particularly, to a liquid filtration system which accommodates the periodic cleaning of the filter with a cleaning solution. Specifically, the invention relates to a liquid filtration system in which the efficiency of the system is continually optimized by periodically cleaning the filter to its maximum filtration capability and subsequently entering the filtration process until such time that the permeate flow rate of the liquid through the filter membrane indicates that cleansing of the filter is again required.

BACKGROUND ART

It has previously been known to filter liquids which comprise a process fluid having both low molecular weight organics such as water, dissolved salts, solvents, and high molecular weight organics such as emulsified oils, suspended solids, colloids, and polymers therein. Particularly, it has been known to provide a means for separating the low molecular weight liquid from the high molecular weight organic material entrained therein by passing the process fluid through a membrane filter. Such systems employ reverse osmosis filters or what are generally termed "ultra filters" in a two tank system in order to achieve the necessary filtering. Typically, a working tank contains the process fluid to be filtered and a cleaning solution tank contains a cleaning fluid such as an appropriate detergent to clean the filter itself. The systems typically contain valves that switch the filter from a working tank to a cleaning tank and back again. Such valves may be either manual or automated.

Ultra filters need to be cleaned or regenerated after they have been used for a period of time. One of the ways of determining that cleaning of the filter is required is to monitor the flow of liquid (permeate) from the filter membrane itself. As the flow decreases due to fouling or blinding of the filter, the efficiency of the system decreases. Accordingly, periodic cleaning of the filter itself is required by passing a cleaning fluid or detergent therethrough.

It is particularly important to terminate the filtering process and clean the filter prior to any point in time that the filter itself has become totally clogged or damaged. Such membrane filters are extremely expensive and, accordingly, in order to protect the filter and assure optimum operation of the filtering system, such periodic monitoring and cleansing of the filter is required. In the past, a variable area inline flow meter was monitored to manually determine the permeate flow rate through the filter membrane and to determine when cleaning of the filter was required. Such a technique is, of course, extremely inaccurate and given to costly error.

The prior art has generally taught numerous types of filtration systems for filtering the process fluid. Specifically, the prior art has taught a broad range of filtering systems in which periodic cleansing of the filter medium is undertaken. However, none of the prior art systems are given to an optimized automated approach to such filtration and maintenance of system integrity. There is a need in the art for an automated fluid filtration system which achieves optimization of the filtering process by monitoring the flow rate of permeate through the filter membrane and periodic cleaning of the filter as a function of such flow rate.

DISCLOSURE OF INVENTION

In light of the foregoing, it is a first aspect of the invention to provide a fluid filtration system which is substantially automatic in nature. Another aspect of the invention is the provision of a fluid filtration system which maximizes operation by periodically cleaning the filter medium when the permeate rate of flow drops below a determined level.

Still a further aspect of the invention is the provision of a fluid filtration system which substantially eliminates the possibility of human error in monitoring and determining the efficiency of the system.

Yet another aspect of the invention is the provision of a fluid filtration system which is highly efficient, reliable and durable in operation, and easy to implement with state of the art components and techniques.

The foregoing and other aspects of the invention which will become apparent as the detailed description proceeds are achieved by a fluid filtration system, comprising: a first supply of process fluid to be filtered; a second supply of filter cleaning fluid; a filter interposed between said first and second supplies; a pump interposed among said filter and said first and second supplies; an array of valves interconnected to said pump, filter, and first and second supplies, said valves allowing selective interconnection and circulatory intercommunication of said filter with said first and second supplies; and a flow meter connected to said filter, said flow meter providing output signals determinative of said selective interconnection.

Other aspects of the invention which will become apparent herein are attained by a method for filtering the process fluid, comprising: passing the process fluid through the filter until the flow rate of the permeate through the filter membrane drops below a first threshold; passing a cleaning solution through said filter to clean said filter to accommodate an increased flow rate of permeate through the filter membrane; reestablishing said first threshold; and passing process fluid through said filter until the flow rate of the permeate through the filter membrane drops below said first threshold.

BRIEF DESCRIPTION OF THE DRAWINGS

For a complete understanding of the objects, techniques and structure of the invention reference should be made to the following detailed description and accompanying drawings wherein:

FIG. 1 is a block diagram of a filtration system made in accordance with the invention;

FIG. 2 is a functional block diagram of the control system employed with the filtration system of FIG. 1;

FIG. 3 is a graph illustrating permeate flow rate as a function of time; and

BEST MODE FOR CARRYING OUT THE INVENTION

Figure 4:
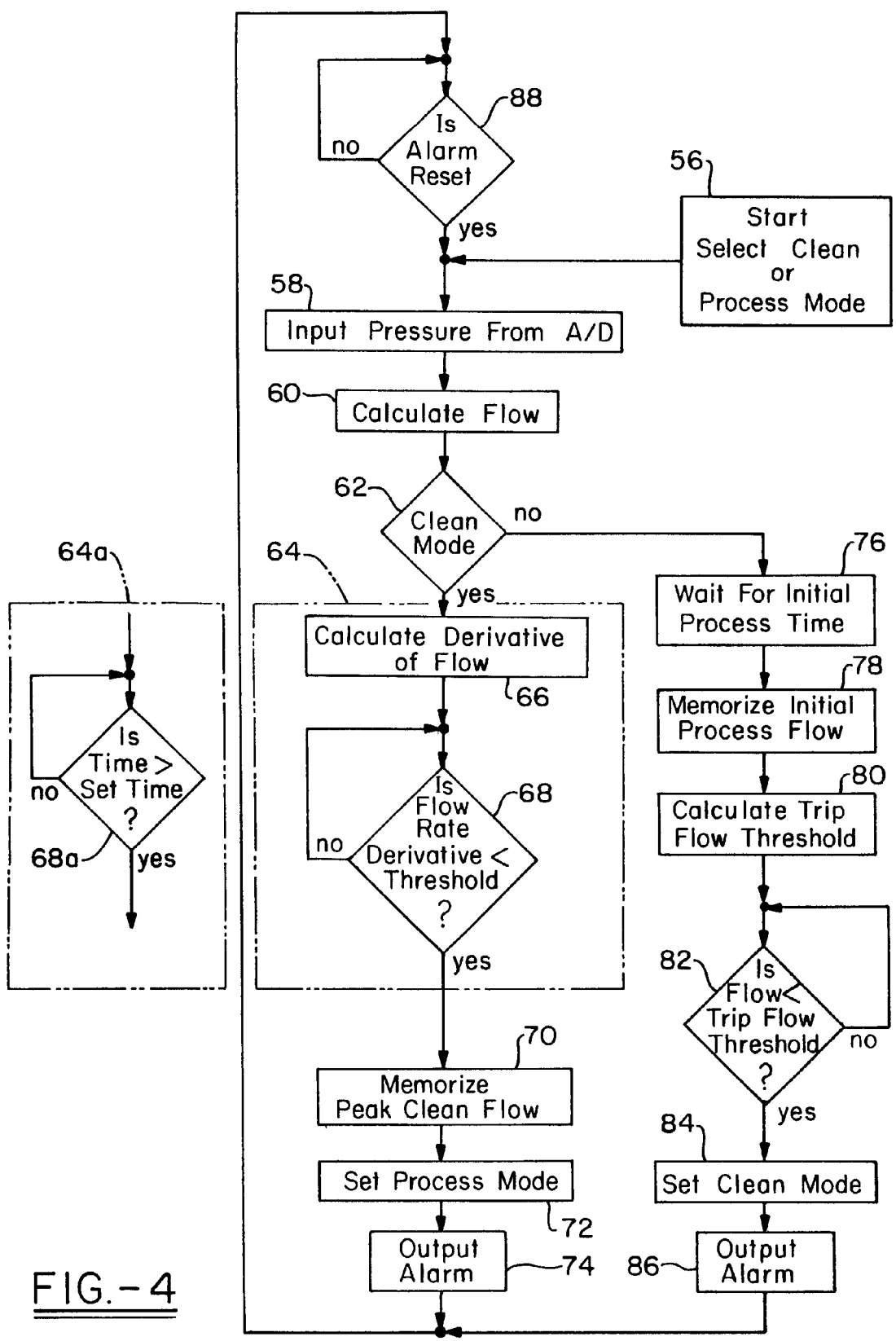
FIG. 4 is a flow chart illustrating the process of the invention.

Referring now to the drawings and more particularly to FIG. 1, it can be seen that a filtration system made in accordance with the invention is designated generally by the numeral 10. The filtration system 10 includes a tank 12 which has process fluid such as spent metalworking fluids which contain water soluble oils, suspended solids or the like therein, such process fluid being presented for filtration to separate the oil and solids of the process fluid from the water. A second tank 14 maintains therein an appropriate filter cleaning fluid, for purposes to be discussed below. A filter 16 is provided for cleaning the process fluid maintained in the tank 12 and, for purposes herein, can be considered an ultra filter, as are well known in the art of industrial waste management.

A pair of valves 18, 20 are interposed in association with the filter cleaning fluid tank 14 and filter 16 to allow for selective passing of the cleaning fluid through the filter. Similarly, valves 22, 24 are interposed between filter 16 and the tank 12 of process fluid in order to direct the passage of process fluid through the filter. As will become apparent below, the valves 18–24 may be either automatically or manually actuated.

A recirculation pump 26 is interposed between the filter 16 and the outlet valves 20, 24 of respective tanks 14, 12 and runs continuously. The recirculation pump 26 provides for selective passage of either process fluid or cleaning fluid through the filter 16, depending upon the state of actuation of the pairs of valves 18, 20 and 22, 24.

In accordance with the invention, a differential pressure transducer 28a is interposed in a low loss venturi 28b and operated as a flow meter to monitor the flow rate of permeate through the filter membrane 16. Some of the permeate which has passed through the filter membrane passes through a conduit such as a plastic tube 28c, through the low loss venturi 28b, and then through another conduit 28d to a recovery tank or the like. Those skilled in the art will appreciate that a direct relationship exists between the pressure and flow rate and, accordingly, a differential pressure transducer and low loss venturi may be employed as such a flow meter. In accordance with the preferred embodiment of the invention, the differential pressure transducer 28a and the venturi 28b are of the low loss venturi type, since the pressures of permeate from the filter membrane 16 are low and it is desirable that the flow meter itself provide minimal obstruction to such flow.

The output of the differential pressure transducer 28a is an electrical signal which correlates with the flow rate. This signal is applied to a control system 30 which functions in a manner to be discussed below. Suffice it to say at this time that the control system 30 may be employed to automatically control the opening and closing of the valves 18–24 consistent with the desirability of selectively passing either process fluid or cleaning solution through the filter 16. It will be appreciated by those skilled in the art that the pairs of valves 18, 20 and 22, 24 are actuated in a mutually exclusive manner.

With reference now to FIG. 2, it can be seen that the control system 30 includes an appropriate amplifier 32 receiving the output signal of the differential pressure sensor 28a. The amplified signal is passed from the amplifier 32 to an analog/digital converter 34, from which the digitized output of the amplified transducer signals is passed to an appropriate microprocessor 36. The microprocessor 36 then correlates the digitized pressure signal to permeate flow rate. An appropriate memory 38 is provided in association with the microprocessor to receive and maintain data therein. An appropriate display 40, such as a liquid crystal display, is also provided in association with the microprocessor 36 to provide visual output indicia of the permeate flow rate and of the operational sequence of the process of the invention. However, in an embodiment in which the valves 18–24 are not automatically actuated, but in which manual intervention is required, directions to the operator of the need for switching between tanks and the like can be presented on the liquid crystal display 40.

As will become apparent later herein, a manual select switch 39 is provided to allow an operator to select, through the microprocessor 36, either the clean or process mode. Similarly, in manual operation, an alarm is activated at the end of the clean and process cycles to advise the operator to appropriately open and close the valves 18–24. Upon completion of that task, the operator resets the alarm as at 41, causing the microprocessor 36 to begin the next process.

It should be appreciated that the concept of the invention is to optimize the efficiency of the filtration system 10 by monitoring the flow rate of permeate through the filter membrane 16 and periodically terminating the process cycle (during which process fluid is passed through the filter) to enter into a filter cleaning cycle (during which a cleaning solution is passed through the filter). This technique is achieved by dividing the operation of the filtration system 10 into two particular sections, a first "clean" section in which the filter 16 is itself cleaned, and the "process" section during which time process fluid is passed through the filter 16. A pair of clean and process cycles are designated by the numeral 42 in the graph of FIG. 3. There, it can be seen that the clean cycle is designated by the numeral 44 and the process cycle by the numeral 46.

During the cleaning cycle 44, the valves 18, 20 are opened and the valves 22, 24 are closed such that only cleaning solution passes through the filter 16. During this cycle, the flow rate of permeate from filter membrane 16 is monitored and, as shown in FIG. 3, will typically be observed as being of increasing rate to a peak value where the flow rate stabilizes or the rate of change flattens out. In a mathematical context, the derivative of flow rate with respect to time would approach zero. Effectively, the derivative of the rate of change of flow rate with respect to time is taken by simply periodically monitoring the flow rate and determining when the flow rate has substantially stabilized. Depending upon the filter, process fluid, and cleaning fluid employed, the monitoring of the flow rate of permeate through the filter membrane may be undertaken on intervals of anywhere from 2–30 minutes. In any event, when the flow rate has stabilized, the clean cycle is departed and the process cycle is entered.

As shown in the graph of FIG. 3, in the process cycle with the valves 18, 20 being closed and the valves 22, 24 being opened, an initial substantial drop in permeate flow rate is experienced as at 48. Depending upon the nature of the filter 16, the process fluid of the tank 12, and the nature of the pump 26, the period of time necessary to maintain the transition from the cleaning to the process cycle may vary. Typically, this time will be on the order of 2–10 minutes. In any event, following the initial transition, it has generally been found that the flow rate of permeate from the filter membrane 16 will degrade in somewhat of a gradual manner as designated by the line 50–52 in FIG. 3. In accordance with the invention, at a fixed time delay following the switch from the clean to the process cycle, a flow rate reading is made at 50. It is then determined that a clean cycle will necessarily be required when the flow rate has diminished by a certain percentage from that measured at 50. According to one embodiment of the invention, it has been determined that a clean cycle will be entered when the flow rate during the process cycle drops to 50 percent of that measured at 50. In other words, with flow rate at 50 designated the initial process peak flow, a clean cycle will be entered at 52 which is the point at which the flow rate of permeate through the filter membrane 16 during the process cycle is at 50 percent of the initial process peak flow measured at 50. Again, depending upon the parameters of the filtration system 10 and the process fluid to be treated, such percentage may vary. Indeed, the flow rate at which the cycle changes (trip flow threshold) may be selected as a percentage of the flow rate first measured when the process cycle is entered, or at any other suitable point. Suffice it to say that when a clean cycle is entered as at 52, the valves 22, 24 are closed (either manually or automatically by the control system 30) and the valves 18, 20 are similarly opened. The clean cycle 44 is entered and the cleaning of the filter 16 continues until the derivative of the rate of change of flow rate with respect to time approaches zero or stabilizes.

Referring now to FIG. 4, an appreciation of the method of the invention can be attained. As shown, the method is entered at 56 with the operator starting the operation and selecting either the cleaning 44 or process 46 mode of operation. The input pressure of the sensor 28*a*, as digitized by the A/D converter 34, is then determined and converted to a flow rate at 58, 60. If the process mode has been chosen, the determination is made at 62 to enter that mode. At 76, a time delay is entered to accommodate the initial drop in flow rate 48 as shown in FIG. 3. After that time delay, the initial process peak flow rate 50 is measured at 78 and the trip flow threshold rate 52 is established at 80. The passage of process fluid from the tank 12 through the recirculation pump 26 and filter 16 continues as at 82 until the flow rate drops below the flow rate threshold at 52. At this time, the cleaning cycle 44 is entered at 84.

In an automated system, the control system 30 would then close the valves 22, 24 and open the valves 18, 20, with appropriate time delays to effectuate the mode change without unnecessary intermix of the clean and process fluids. On a manual system, an audible or visual alarm is actuated at 86 to advise the operator of the need to so control the valves 18–24 to effect the mode change. When the change is manually effected, the operator resets the alarm as at 88 and the process continues with a determination of flow rate at 58, 60 and entry into the clean mode at 62.

With the clean mode having been entered, the decision block 62 enters the clean cycle operative process 64, as shown. Here, the time derivative is effectively determined as at 66 and is continually monitored at 68 until the flow rate has stabilized, as shown in FIG. 3 at the peak of the cleaning cycle 44. Again, this is accomplished by periodically monitoring the flow rate of permeate through the filter membrane 16 until minimal change in flow rate is experienced from one sample time to the next or, in other words, until the flow rate has stabilized. When this has occurred, the peak clean flow rate is sensed at 70 and stored in the memory 38. In accordance with one embodiment of the invention, the peak clean flow rate can be employed as the basis for setting the trip flow threshold 52, as compared to employing the initial process peak flow rate 50. In any event, following storage of the peak cleaning flow rate at 70, the process mode is entered at 72.

In an automated system, the control system 30 would then close the valves 18, 20 and open the valves 22, 24, with appropriate time delays to effectuate the mode changes, without unnecessary intermix of the clean and process fluids. In a manual system, the alarm is actuated at 74 to advise the operator of the need to so control the valves 18–24 to effect the mode change. When the change is manually effected, the operator resets the alarm as at 88 and the process continues with a determination to flow rate at 58, 60 and entry into the clean mode at 62. It can be seen that the process 46 again continues until the permeate flow rate through the filter membrane 16 drops below the flow threshold 52, at which time the clean mode is again entered.

It will be appreciated that the system of FIG. 4 was just described with an automated cleaning cycle 64, such cycle operating on the basis of monitoring the permeate flow though the filter membrane 16 until such flow has stabilized. Alternatively, the process 64*a* can be employed in the method of FIG. 4 by which cleaning solution is caused to pass through the tank 14 to the filter 16 for a fixed duration of time, such time being sufficient, in the ordinary course of events, to effect thorough cleansing of the filter 16. In that embodiment, the decision block 68*a* is simply a timer which causes the clean cycle 44 to continue for a fixed period of time, after which the clean cycle is departed and the process cycle entered. This fixed period of time may, of course, be adjusted by the operator.

It should now be apparent that the concept of the invention provides periodic cleaning of filter 16, followed by a processing cycle which proceeds until the efficiency of the filter 16 has degraded, by blinding of the filter or otherwise, to a predetermined level. At that time, the cleaning cycle is entered and the filter is cleaned to an optimum level, at which time the process cycle is again entered. Accordingly, the concept of the invention is sequentially and repetitively entering processing and filter cleaning cycles at such a rate and in such a manner as to assure optimum efficiency of the process fluid filter process.

Thus it can be seen that the objects of the invention have been satisfied by the structure and technique presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A fluid filtration system, comprising:
   a first supply of process fluid to be filtered;
   a second supply of filter cleaning fluid;
   a filter having a membrane interposed between said first and second supplies;
   a pump interposed among said filter and said first and second supplies;
   an array of valves interconnected to said pump, filter, and first and second supplies, said valves allowing selective interconnection and circulatory intercommunication of said filter with said first and second supplies;
   a flow meter connected to said filter, said flow meter providing output signals determinative of said selective interconnection; and
   a control system interconnected with said flow meter, said control system receiving said output signal and determining therefrom which of said first and second supplies is interconnected in circulatory communication with said filter, said control system further cleaning said filter by interconnecting said filter with said second supply and monitoring said flow meter until a rate of flow of permeate cleaning fluid from said filter stabilizes, and wherein said control system interconnects said filter with said first supply to effect filtering of the process fluid, and said control system determines an initial flow rate of permeate of process fluid and continues said filtering of process fluid until said flow rate of said process fluid permeate falls below a threshold, said control system determining said threshold as a function of said initial permeate flow rate.

2. The fluid filtration system according to claim 1, wherein said flow meter comprises a low loss venturi and a differential pressure sensor.

3. The fluid filtration system according to claim 1, wherein said control system interconnects said filter with said second supply when said flow rate of said process fluid permeate falls below said threshold.

4. The fluid filtration system according to claim 1, wherein said valves are manually actuated.

5. The fluid filtration system according to claim 1, wherein said control system cleans said filter by interconnecting said filter with said second supply for a preset period of time to effect cleaning of said filter.

6. A method for filtering process fluid, comprising:

passing process fluid through a filter having a membrane until the flow rate of the permeate from the filter membrane drops below a first threshold;

passing a cleaning solution through said filter having a membrane to clean said filter to accommodate an increased flow rate of permeate from the filter membrane passing said cleaning solution for a predetermined period of time and monitoring the permeate flow rate of the cleaning solution from the filter membrane until the cleaning solution permeate flow rate is stable;

reestablishing said first threshold;

passing process fluid through said filter until the flow rate of the permeate from the filter membrane drops below said first threshold; and cycling between passing process fluid through the filter the until process fluid permeate flow rate is below said first threshold and passing cleaning solution through said filter until the cleaning solution permeate flow rate becomes stable, and wherein said first threshold is set as a function of said stable flow rate.

7. The method according to claim 6, wherein said first threshold is set as a function of the flow rate of the process fluid permeate from the filter membrane at a fixed time following commencement of said flow of process fluid permeate through the filter membrane.

* * * * *